March 17, 1953  E. J. PERRIN  2,631,665

MULTIPLE VALVE CONTROL UNIT

Filed Dec. 18, 1950 3 Sheets-Sheet 1

INVENTOR
E. J. Perrin
BY
ATTORNEYS

March 17, 1953 E. J. PERRIN 2,631,665
MULTIPLE VALVE CONTROL UNIT
Filed Dec. 18, 1950 3 Sheets-Sheet 2

INVENTOR
E. J. Perrin
BY
ATTORNEYS

March 17, 1953 E. J. PERRIN 2,631,665
MULTIPLE VALVE CONTROL UNIT
Filed Dec. 18, 1950 3 Sheets-Sheet 3

INVENTOR
E. J. Perrin
BY
ATTORNEYS

Patented Mar. 17, 1953

2,631,665

UNITED STATES PATENT OFFICE 2,631,665

MULTIPLE VALVE CONTROL UNIT

Eddie J. Perrin, Lodi, Calif.

Application December 18, 1950, Serial No. 201,271

2 Claims. (Cl. 161—7)

This invention relates generally to water softening apparatus.

In water softening apparatus of the type adapted to be regenerated at recurrent periods, a multiple valve assembly is provided in the conduit system of the apparatus for the purpose of performing the regeneration cycle. Such cycle comprises back washing through the water softening tank, then feeding brine through said tank, followed by a fresh water rinsing flow therethrough; the softening tank normally being connected in the conduit system in a service position between the hard water inlet pipe and the softened water outlet pipe, which service position the valve assembly therefor occupies at the start and finish of the regeneration cycle.

Heretofore it has been the practice to manually actuate the valve assembly for the accomplishment of each step of the regeneration cycle; this being a practice which requires careful personal attendance to the apparatus, which is an inconvenience.

It is therefore a major object of the present invention to provide a novel control unit for automatically actuating the multiple valve assembly in the conduit system of the apparatus, and in a manner to perform the regeneration cycle without personal attendance after initiation of the operation of said control unit.

Another important object of this invention is to provide an automatic control unit, for the multiple valve assembly of water softening apparatus, which includes a motor driven time switch assembly arranged in a novel manner to control a separate electric motor driven power mechanism which motivates the multiple valves of said assembly in predetermined order, as is necessary to carry out the regeneration cycle.

An additional object of the present invention is to provide an automatic control unit which is readily adaptable to a standard multiple valve assembly of a water softening apparatus of the type described; the control unit being especially designed but not limited for use on a multiple valve assembly such as is employed on the Stover "Pacemaker" water softener, manufactured by the Stover Water Softener Co., St. Charles, Illinois, which valve assembly is shown in Manual #64 of such company.

A further object of the invention is to provide an automatic control unit, for the multiple valve assembly of a water softening apparatus, as above, which is relatively simple in its structure, economical to produce, and embodying parts which require a minimum of attention by way of servicing or repair.

Still another object of the invention is to provide a practical and reliable multiple valve control unit, and yet one which will be exceedingly effective for the purpose for which it is designed.

These objects are accomplished by means of such structure and relative arrangement of parts as will fully appear by a perusal of the following specification and claims.

Figure 1:
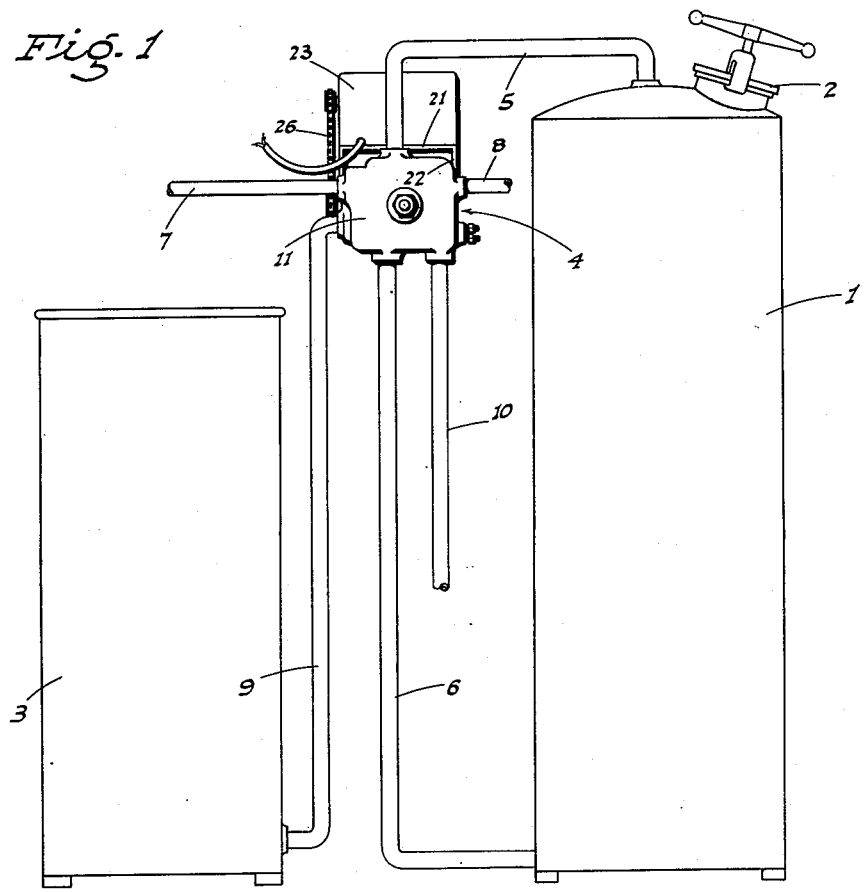
Fig. 1 is a somewhat diagrammatic elevation of water softening apparatus embodying a multiple valve assembly having the present invention mounted in connection therewith.

All of the figures show the parts in the position occupied thereby at the start of the regeneration cycle.

Referring now more particularly to the characters of reference on the drawings, this invention is adapted for use in connection with apparatus which includes a water softening tank 1 having a filler cap 2; a brine tank 3; and a multiple valve assembly, indicated generally at 4.

The water softening tank 1, brine tank 3, and multiple valve assembly 4 are interconnected in a conduit system which comprises a top pipe 5 which leads from the upper end of the valve assembly 4 to the corresponding end of the tank 1; a bottom pipe 6 which leads from the lower end of the valve assembly 4 to the corresponding end of the tank 1; a hard water inlet pipe 7 connected to one side of the valve assembly 4; a soft water outlet pipe 8 connected to the other side of the valve assembly 4; a brine pipe 9 connected between said one side of the valve assembly 4 and the bottom of the brine tank 3; and a drain pipe 10 which leads from the lower end of said valve assembly 4 from a point alongside the bottom pipe 6.

In the normal or service position of the apparatus hard water flows from the inlet pipe 7 and is fed by the valve assembly 4 through the top pipe 5 into the water softening tank 1; the softened water then flowing out of the tank into the bottom pipe 6, through said valve assembly 4, and to the soft water outlet pipe 8.

The internal structure of the multiple valve assembly 4 is not here shown, but is clearly illustrated in the aforesaid Manual #64 of the Stover Water Softener Co.

It will be understood, for the purpose of the present invention, that the multiple valve assembly 4 includes a housing 11 in which the valves, six in number, are enclosed; cooperating in said housing with certain valve seats, porting, and ducting.

The valves are of poppet type and include valve stems 12 which project out of the front of the housing 11 through packing glands 13.

The valve stems 12 are adapted to be depressed, whereby to open the corresponding valves, by means of rocker arms, indicated at A, B, C, D, E, and F, cooperating with corresponding ones of said stems; said rocker arms being pivotally mounted three on an upper cross shaft 14 and three on a lower cross shaft 15. Such cross shafts are carried on upper and lower supporting arms 16 and 17, respectively, which project forwardly from the front of the housing 11.

The automatic control unit for the foregoing multiple valve assembly comprises a cam shaft 18 which extends horizontally outwardly of, but adjacent, the rocker arms A-F, inclusive; such cam shaft 18 being supported, at opposite ends, by arms 19 which project forwardly from the housing 11.

The cam shaft 18 is formed with a plurality of cams 20, such cams corresponding to said rocker arms, and being formed to actuate the latter in successive pairs, with each revolution of said cam shaft, as follows:

At the outset, when the cam shaft 18 is idle and in starting position, the rocker arms C and F are cam-actuated, opening the related valves. This establishes communication between hard water inlet pipe 7 and top pipe 5, and between bottom pipe 6 and soft water outlet pipe 8; being the normal or service position of the water softening apparatus.

With rotation of the cam shaft 18 a first-quarter turn (said quarter-turns each having a dwell therebetween, as will hereinafter appear), the cams act to actuate rocker arms B and C, opening the related valves for the backwashing step of the regeneration cycle; pipes 7 and 6 being connected, pipes 5 and 10 being connected, and a backwashing flow of water moving upward in tank 1 and finally discharging from pipe 10.

The second quarter-turn of the cam shaft 18 brings cams into play which actuate rocker arms A and D, opening the related valves for the brine feeding step of the regeneration cycle; brine pipe 9 then being in communication with top pipe 5, and bottom pipe 6 feeding to drain pipe 10.

When the third quarter-turn of the cam shaft 18 occurs, cams actuate rocker arms C and D, opening the related valves, whereupon the rinsing step of the cycle begins; pipes 7 and 5 being connected, pipes 6 and 10 being connected, and a rinsing flow of water traveling downward in tank 1 and finally discharging from pipe 10.

Upon the cam shaft 18 making its fourth quarter-turn, which returns it to starting position, rocker arms C and F are again actuated, re-establishing the water softening apparatus in service position.

The cam shaft 18 is driven in the following manner:

A horizontal platform 21 is disposed above the cam shaft 18, and said platform includes depending end plates 22 which are secured to the supporting arms 19.

Figure 3:
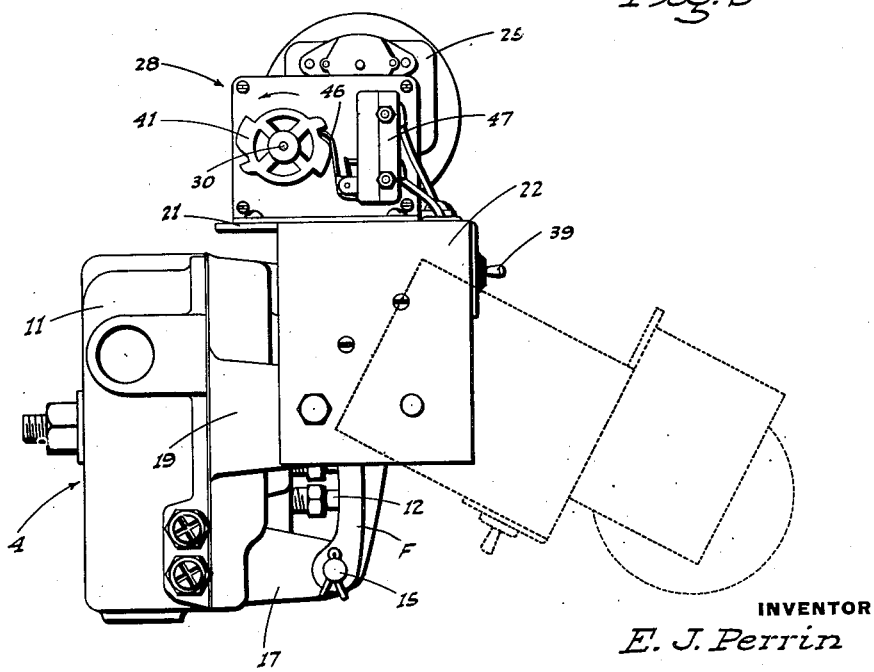
Fig. 3 is an end elevation of the same.
Figure 4:
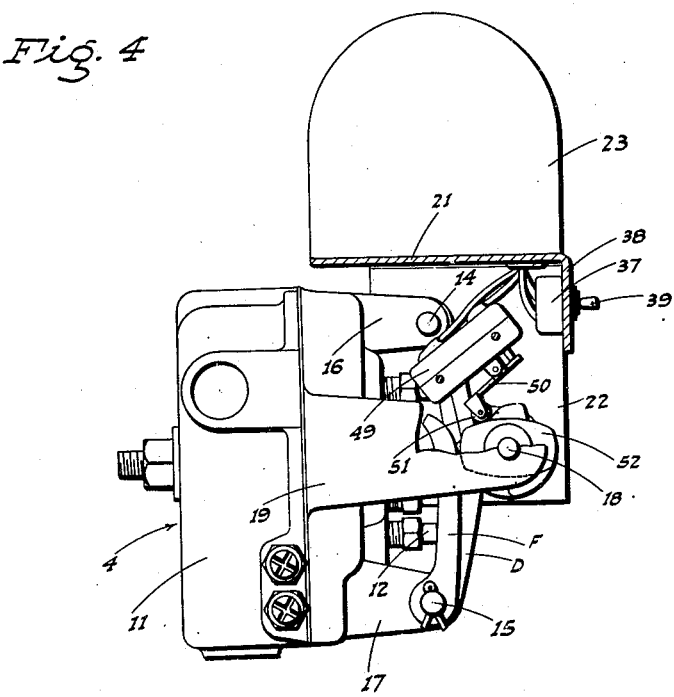
Fig. 4 is an end elevation of the multiple valve assembly and automatic control unit thereon; the top cover remaining in place but the platform, adjacent end plate, and one of the supporting arms being partly broken away.
Figure 5:
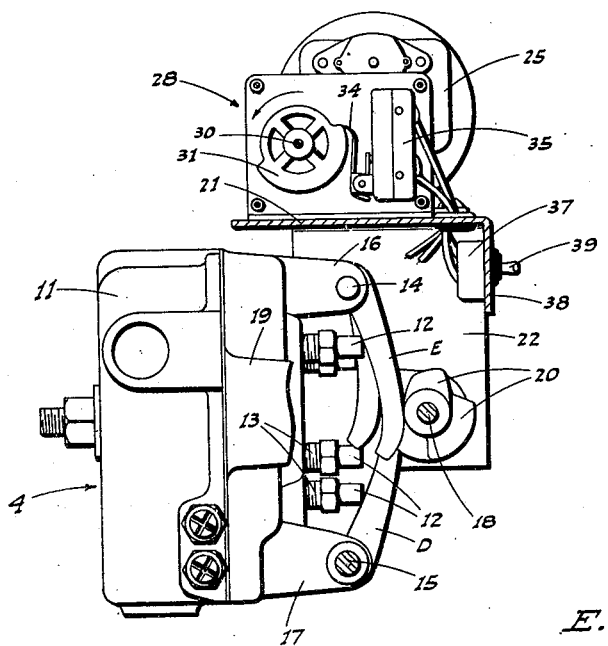
Fig. 5 is a cross section on line 5—5 of Fig. 2.

While normally fixed to said arms 19, the end plates 22 are connected so that said plates, together with the platform 21, and the parts thereon—as hereinafter described—may be swung from normal upstanding position, as in full lines in Fig. 3, downwardly and rearwardly to a lowered position, as in dotted lines in said figure; the purpose of such lowered position being to permit manual access to the rocker arms A-F, inclusive, and associated parts.

The platform 21 carries a removable top cover 23, which protects the parts mounted on said platform.

A reduction gear box 24 is mounted on one end of the platform 21, being driven by an electric motor 25.

An endless chain and sprocket unit 26 connects between the output shaft 27 of the reduction gear box 24 and the corresponding end of the cam shaft 18.

The electric motor 25 is controlled by the following circuiting arrangement:

An electric motor-driven time switch assembly, indicated generally at 28, is mounted on the platform 21 beyond the electric motor 25. The time switch assembly 28 includes an electric timing motor 29 which drives a timing shaft 30; there being a timing cam 31 fixed on the timing shaft 30.

The timing cam 31 is formed with a 180° low cam surface 32 and a 180° high cam surface 33. The timing cam 31 cooperates with the switch actuating arm 34 of a single-pole, double-throw switch 35 supported above the platform 21 adjacent said timing cam 31.

A two-wire control circuit 36 connects the opposed terminals of the switch 35 with the corresponding terminals of a manually actuated, single-pole, double-throw switch 37 mounted on a flange 38 depending from the front edge of the platform 21; the numeral 39 indicating the hand lever for actuating said switch 37.

The timing motor 29 is interposed in one lead of a current supply circuit 40; one lead of such circuit connecting to the common terminal of the switch 35, while the other lead of said circuit connects to the common terminal of the switch 37.

Figure 6:
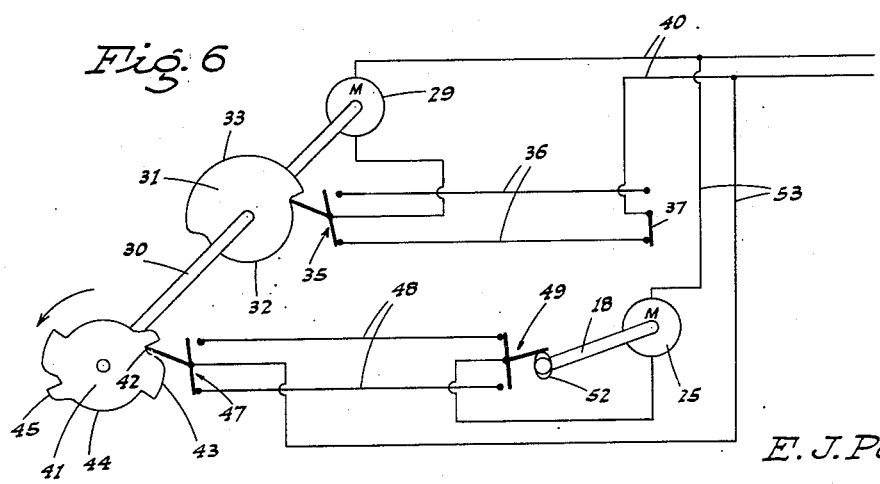
Fig. 6 is a diagram of the control circuit.
Figure 2:
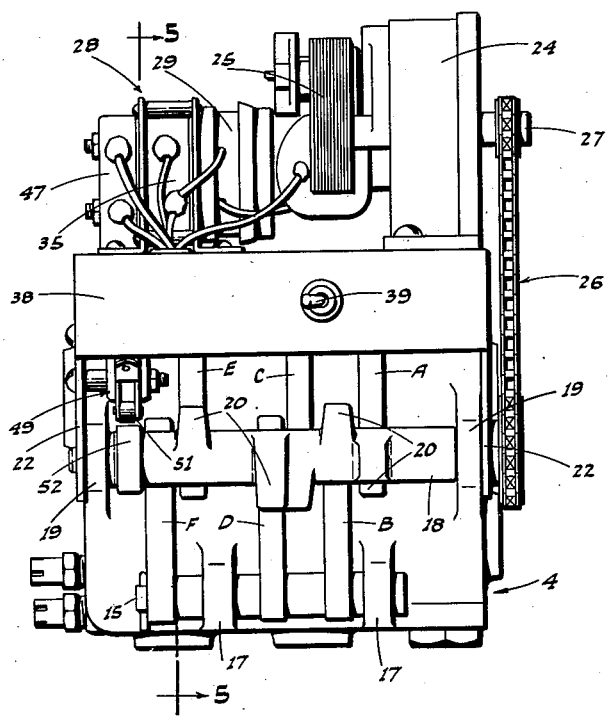
Fig. 2 is a front elevation of the multiple valve assembly and automatic control unit thereon, with the top cover removed.

Upon closing of the switch 37 to one side, as in Fig. 6, the circuit 40 is completed, whereupon the timing motor 29, which includes suitable reduction gearing, runs until the timing shaft 30 has made a one-half revolution, whereupon the timing cam 31 reverses the switch 35, stopping the timing motor 29. The motor 29 thus can drive the timing shaft 30 only through a half-turn, and to obtain the next half-turn requires that the switch 37 be reversed in its position.

In short, the switch 37 serves, with alternate closing thereof, to cause a one-half turn of the timing shaft 30.

Beyond the timing cam 31 the timing shaft 30 is fitted with a control cam 41 for the cam shaft driving motor 25; such control cam in each 180° of the circumference thereof being formed in succession with a low point 42, a high point 43, a low point 44, and a high point 45; these points corresponding to the quarter-turn motions of the cam shaft 18, which motions the cam 41 controls as follows:

The control cam 41 is secured on the timing shaft 30 so that one working half of the control cam 41 cooperates with a switch actuating arm 46, with each half-turn of said timing shaft 30 under the control of the timing cam 31.

The arm 46 actuates a single-pole, double-throw switch 47 mounted on the platform 21 adjacent said control cam 41.

A two-wire control circuit 48 is connected between the opposed terminals of the switch 47, and like terminals of another single-pole, double-throw switch 49 mounted above one end portion of the cam shaft 18. The switch 49 includes a switch actuating arm 50 having a roller 51 which rides on a double-ended cam 52 of said cam shaft.

The numeral 53 indicates the current supply circuit for the cam shaft driving motor 25; the motor being interposed in one side of such circuit. The current supply circuit 53 has its leads connected to the common terminals of the switches 47 and 49, respectively; such switches being set to work in opposition.

With each half-turn of the control cam 41 by the timing motor 29, and under the control of the cam 31, said cam 41—as the switch actuating arm 46 is motivated by the low point 42, high point 43, low point 44, and high point 45—alternately works the switch 47, closing the current supply circuit 53 four times, twice on each side of the two-wire control circuit 48. After each closure of the current supply circuit 53, as above, the cam shaft driving motor 25 actuates the cam shaft 18 through a quarter-turn, whereupon the double-ended cam 52 comes into play, reversing the position of the switch 49, breaking said circuit 53 until the control cam 41 next works the switch 47 to reverse the latter.

Thus, during each half-turn of the timing shaft 30 the control cam 41 and the double-ended cam 52 work in the described circuit to cause the motor 25 to recurringly turn the cam shaft 18 a quarter-turn and then stop; the dwell between such quarter-turns being predetermined by the cam lengths of the control cam 41.

After said control cam 41 has acted through a half-turn, to cause four quarter-turns of the cam shaft 18, the switch actuating arm 46 drops into the following low point 42, and substantially simultaneously the timing cam 31 shuts off the timing motor 29 preparatory to the next cycle of operation, which cycle does not occur until the switch 37 is reversed.

With the foregoing control circuit arrangement, the cam shaft 18 is properly actuated during each regeneration cycle of the water softening apparatus, being rotated quarter-turns in succession, with a dwell between each turn as desired and for the functional purpose heretofore described; the dwells representing the steps of the regeneration cycle of the water softening apparatus, to-wit backwashing, brine feeding, and rinsing, and then returning to service position.

With the described control unit, the multiple valve assembly 4 of a water softening apparatus of the type described is cyclically actuated by power mechanism, under automatic control, and in a positive and effective manner, eliminating the necessity of manual or personal attendance to the apparatus during regeneration thereof.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A control unit for a multiple valve assembly having a housing and a bank of separately movable valve control elements projecting from the housing; said unit comprising a cam shaft journaled in connection with the housing in actuating relation to said valve control elements, cams on the shaft arranged to actuate different valve control elements upon successive part-turns of said cam shaft, an electric motor operatively connected to the cam shaft, a timing cam arranged to be rotated through a predetermined arc, a circuit for said motor having a switch in one lead closed by and for the duration of such arcuate rotation of the timing cam, a control cam fixed with the timing cam, and means between the motor and control cam and including switches interposed in the other lead of the circuit actuated upon rotation of the control cam and cam shaft and arranged to cause a breaking of the circuit and stopping of the motor for predetermined recurring periods of dwell while the control cam is rotating and the first named switch is closed.

2. A control unit for a multiple valve assembly having a housing and a bank of separately movable valve control elements projecting from the housing; said unit comprising a cam shaft journaled in connection with the housing in actuating relation to said valve control elements, the cam shaft having cams arranged to actuate different valve control elements upon successive part-turns of said cam shaft, an electric motor operatively connected to the cam shaft, a timing cam arranged to be rotated through a predetermined arc, a circuit for the motor having a switch in one lead closed by and for the duration of such arcuate rotation of the timing cam, a control cam fixed with the timing cam, another cam mounted for rotation with the cam shaft, a two-wire control circuit connected to and including the other lead of the motor circuit, a switch in the control circuit actuated by the control cam, and another switch in the control circuit actuated by said other cam; the control circuit, cams and switches being arranged so that the control circuit is alternately closed and opened for predetermined periods.

EDDIE J. PERRIN.

REFERENCES CITED

The following references are of record in the file of this patent:

UNITED STATES PATENTS

| Number | Name | Date |
| --- | --- | --- |
| 1,713,105 | Tannehill | May 14, 1929 |
| 1,725,110 | Stickney | Aug. 20, 1929 |
| 2,012,194 | Hughes | Aug. 20, 1935 |
| 2,243,815 | Griswold | May 27, 1941 |
| 2,254,795 | Daniels | Sept. 2, 1941 |
| 2,265,225 | Clark | Dec. 9, 1941 |
| 2,284,158 | Lewis | May 26, 1942 |
| 2,290,626 | Bosomworth | July 21, 1942 |